(Model.)
G. H. FERRISS.
CANNON.
No. 246,108. Patented Aug. 23, 1881.
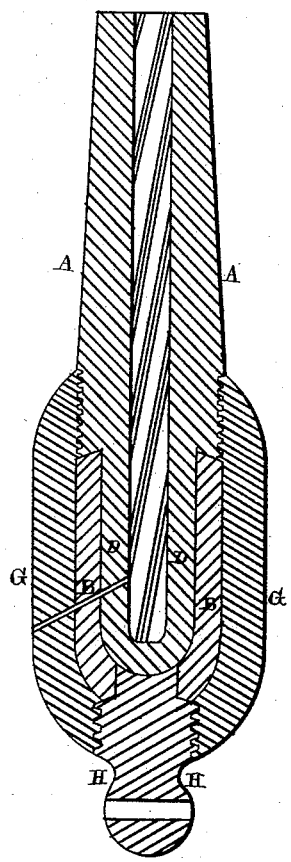
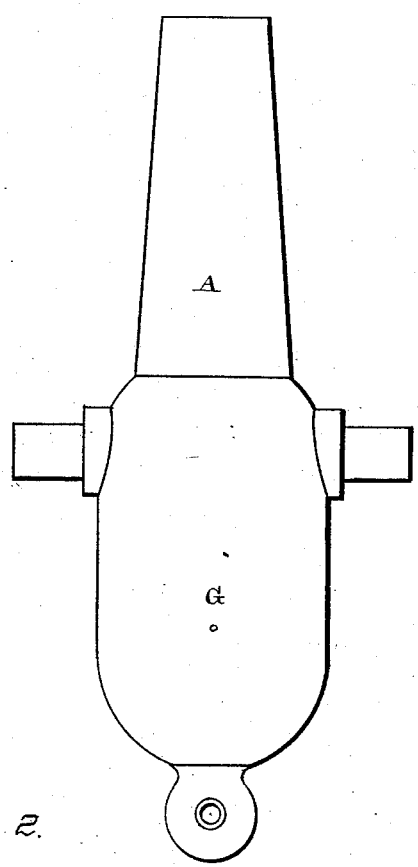
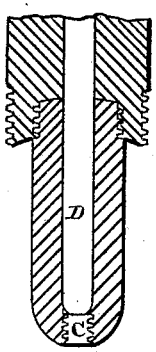
Witnesses.
W. W. Mortimer
A. C. Kiskadden
Inventor.
Geo. H. Ferriss
per
F. W. Lehmann,
Atty.

UNITED STATES PATENT OFFICE.

GEORGE H. FERRISS, OF UTICA, NEW YORK.

CANNON.

SPECIFICATION forming part of Letters Patent No. 246,108, dated August 23, 1881.

Application filed July 5, 1881. (Model.)

*To all whom it may concern:*

Be it known that I, GEORGE H. FERRISS, of Utica, in the county of Oneida and State of New York, have invented certain new and useful Improvements in Cannon; and I do hereby declare the following to be a full, clear, and exact description of the invention, such as will enable others skilled in the art to which it pertains to make and use it, reference being had to the accompanying drawings, which form part of this specification.

My invention relates to an improvement in the manufacture of cannon; and it consists, first, in making the rear ends of both the cup-piece and its outer inclosing-cylinder round, and making openings through them both, to prevent straining or cracking, and to receive a breech-pin; second, in supporting the rear end of the body by the breech-pin, which is passed in through both the cylinder and cup-piece; third, in the construction and arrangement of parts which will be more fully described hereinafter.

The object of my invention is to construct a cannon in which the whole thickness of the walls of the gun will take the strain uniformly, instead of the inner surface taking the greater part.

Figure 1 is a vertical longitudinal section of my invention. Fig. 2 is a detail section of the inner end of the core alone. Fig. 3 is a plan view of my gun complete.

A represents the core or body of the cannon, which will preferably be made of steel, and which has its inner end made considerably smaller than any other portion, so as to receive the cup-piece B, which is to be shrunk upon it. This smaller piece D may either be made of the same material as the body A, and in a single piece with it, or the body may be made of steel and the smaller part D made of malleable or wrought iron, and secured thereto either by means of a screw-thread or in any other suitable manner. Where the two parts are thus made separate, as shown in Fig. 3, an opening, C, will be made through the rear end of the smaller piece for the convenience of manufacture, and so that the part will shrink without straining the metal out of which it is made. Over this smaller part D of the body is passed the cup-piece B while in a heated condition, and which cup-piece shrinks upon the part D in such a manner as to compress the part D sufficiently to slightly decrease the size of the bore of the body. This cup-piece B is also made circular or slanting at its rear end, and has an opening made through it, so that the metal will not be strained in expanding and contracting.

Over the rear end of the body A and the cup-piece B is passed the cylinder G while in a heated state, and which shrinks upon the body and cup-piece B in such a manner as to form, as it were, one solid mass of metal. The body A may be screwed into the front end of the cylinder G, or any other suitable means may be used for connecting them together, and when the cylinder shrinks it will close upon the screw-thread, so that the parts cannot be separated. The rear end of this cylinder G is also made curved, as shown, so that the metal will not be strained in shrinking. Through the rear end of this cylinder is made an opening of larger diameter than is made through the cup-piece B, and the opening through this cylinder G and the cup-piece B is closed by the same breech-pin H, which is screw-threaded, so as to screw into the cylinder G. This breech-pin may also be used for the purpose of supporting the rear end of the body, as shown.

The great trouble with guns heretofore made has been that the greater part of the strain has come upon the inner surface of the gun without its being diffused equally through the entire walls, and hence this part has been the place where the gun has generally given way.

The touch-hole is here shown as passing through the wall of the gun, so as to ignite the cartridge near its center instead of near its rear end.

The bore of the barrel is drifted before the cup-pieces are shrunk on. Otherwise the bore would enlarge by the compression of the soft metal, in which it would be necessary to make a core, and thus spoil the gun. This drifting is very important.

I am aware that cannon have been made where cylinders have been shrunk on, one above another; but there was nothing connected to the body of the gun like what is here shown to prevent the inner core from breaking apart from sudden expansion and contraction.

I am also aware that bands have been put on the outside of guns; but they have proved to be useless, except on a small scale, because the great thickness of the metal under the band prevents the bands from contracting the metal near the bore, and the consequence was, the strain was so much greater in the bore that the guns would crack in a number of places.

Having thus described my invention, I claim—

1. In a cannon, the combination of the body A, having its inner end reduced in size, the cup-piece B, shrunk thereon, and cylinder G, the cup-piece and cylinder having their outer ends made round, and having the opening made through them closed by a breech-pin, substantially as shown.

2. In a cannon, the combination of the body A, having its inner end reduced in size, the cup-piece B, shrunk thereon, cylinder G, and breech-pin H, the breech-pin being passed in through the cylinder G and cup-piece B, and made to form a support for the inner end of the body A, substantially as described.

In testimony whereof I affix my signature in presence of two witnesses.

GEORGE H. FERRISS.

Witnesses:
CHARLES C. KINGSLEY,
JAMES G. FRENCH.